Oct. 16, 1951     L. S. RODGER ET AL     2,571,764
LANTERN SLIDE MOUNT
Filed Nov. 15, 1946
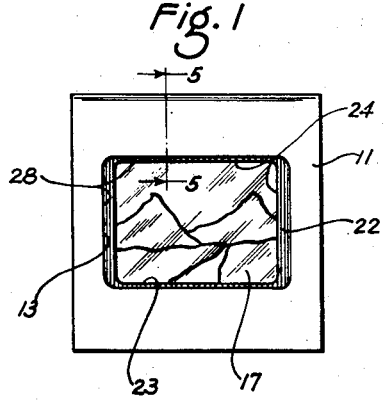
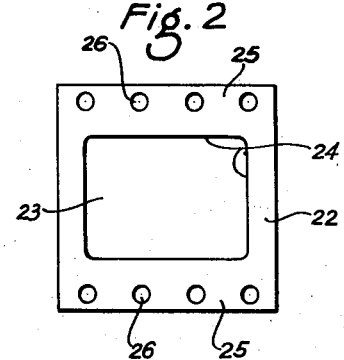
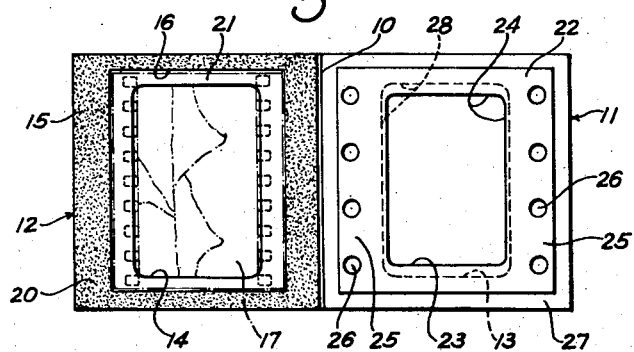
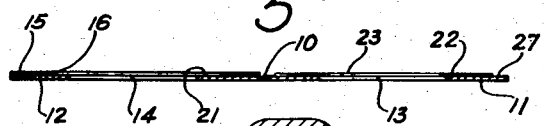
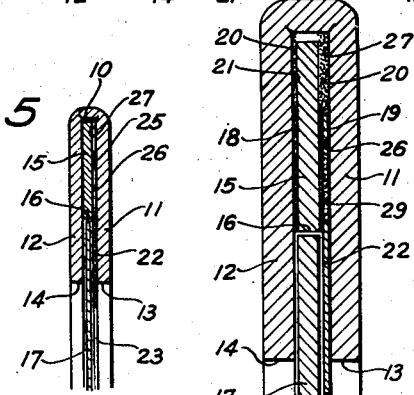
Louis S. Rodger
Colquitt H. Chapman
INVENTORS

Patented Oct. 16, 1951

2,571,764

UNITED STATES PATENT OFFICE 2,571,764

LANTERN SLIDE MOUNT

Louis S. Rodger and Colquitt H. Chapman, Rochester, N. Y., assignors to Eastman Kodak Company, Rochester, N. Y., a corporation of New Jersey Application November 15, 1946, Serial No. 710,206

3 Claims. (Cl. 40—158)

1

The present invention relates to lantern-slide mounts adapted for use in projecting machines.

Such mounts comprise, in general, a pair of similar cardboard members formed with identical-shaped apertures so that when the members are arranged in overlying relation, the apertures will be in registry to afford projecting openings through which light may pass to project the image on the film or transparency positioned between the members and in registry with the apertures thereof. One of the disadvantages of such a cardboard mount is that the apertures are not cut out perfectly or clear enough so that the paper fibers around the edges of the apertures extend into the picture or image area after the die cut has been made, the disadvantages of which will be readily apparent to those familiar with such mounts.

In order to overcome this disadvantage, the present invention provides a metallic insert of thin sheet metal positioned between the film or transparency and the front mount member. This insert is provided with a projection opening or aperture which is slightly smaller than the apertures in the cardboard members. As openings in metal can be clean cut by means of dies, the opening of the insert provides a clear sharp-edged framing aperture or opening for the image area of the film or transparency, thus eliminating positively the ragged fiber-containing edges present in prior mounts in which the apertures in the cardboard are utilized to frame the image area to be projected.

The present invention has, therefore, as its principal object, an insert which affords a clear, sharp, framing aperture for the image to be projected.

A still further object of the invention is the provision of a novel arrangement for retaining the insert in proper position in the mount.

Yet another object of the invention is the provision of a framing insert which adds strength, rigidity, and an attractive appearance to the mount.

To these and other ends, the invention resides in certain improvements and combinations of parts, all as will be hereinafter more fully described, the novel features being pointed out in the claims at the end of the specification.

In the drawings:

Fig. 1 is a front view of a lantern slide mount constructed in accordance with the present invention;

Fig. 2 is an elevation view of the metal insert of the present invention;

Fig. 3 is a plan view of the mount and insert of the present invention with the mount arranged in its open position;

Fig. 4 is an end view of the mount illustrated in Fig. 3;

2

Fig. 5 is a vertical sectional view through a portion of the assembled mount illustrated in Fig. 1 and substantially on line 5—5 thereof, showing the relation of various mount parts and the structure by which the metal insert is retained in proper position in the mount; and Fig. 6 is a vertical sectional view on a larger scale than Fig. 5, showing the adhesive means for positioning the metal insert.

Similar reference numerals throughout the various views indicate the same parts.

The mount of the present invention is formed from a sheet of cardboard or other similar material, which is scored along the line 10 at its midpoint to provide a front section 11 and a back section 12, the sections being formed with identical-shaped apertures 13 and 14 respectively, arranged to register when the sections are positioned in a folded position, as shown in Figs. 1 and 5.

The back section 12 has arranged thereon a paper or cardboard positioning mask 15 which is substantially the same dimensions as the back section 12. This mask is formed with a central opening or seat 16 which is larger than the aperture 14 in the back section 12 and is adapted to receive and position a film or transparency 17, as clearly illustrated in Fig. 3. The opposite sides 18 and 19 of the mask 15 are coated with a suitable adhesive 20. This adhesive is preferably of the thermoplastic type which softens under heat, such, for example, as the kind sold under the trade name of "Vinylite." The use of such a heat-softening adhesive is by way of illustration only, and is not intended as a limitation, as it is contemplated that other suitable types of adhesive may be used. The side 18 of the mask is placed in contact with the inner surface 21 of the back section 12, as shown in Figs. 3 and 4, and is adhesively secured thereto by reason of the adhesive 20.

In order to provide a clean-cut framing aperture for the image-bearing portion of the film 17, the present invention provides an opaque insert 22, preferably in the form of a thin sheet of tempered aluminum approximately .003 inch thick and about 1¾-inches square. These dimensions are not, however, critical and other sizes may be used. This sheet metal insert 22 is provided with a central aperture 23, which is slightly smaller than the aperture 13 of the front member 11 so that the edges 24 of the opening 23 provide a clean-cut framing aperture for the image to be projected.

The two opposite areas or portions 25 outside of the aperture 13 are formed with a group, or row, of perforations 26 of suitable size, approximately ⅛-inch in diameter. While only two areas are provided with such perforations, it is contemplated that such perforations may also be formed on the other side, but it has been found that the arrangement shown is satisfactory for the purpose to be later described, and because it facilitates machine assembly.

In assembling, the mask 15 is positioned with the side 18 overlying the inner surface 21 of the back section 12. The film 17 is then positioned in the recess or opening 16 of the mask. The insert 22 is then placed loosely on the inner surface 27 of the front section 11 with the edges 24 projecting inwardly from the edges 28 of the aperture 13, as shown in Figs. 1 and 3. The parts are then in the position shown in Figs. 3 and 4. The two sections 11 and 12 are then folded on line 10 to bring the sections 11 and 12 into overlying relation, as shown in Figs. 1 and 5, with the apertures 13 and 14 in registry. In this position, the insert 22 will be positioned between the surface 19 of the member 15 and the inner surface 27 of the section 11, as shown in Fig. 5. With the parts in this position, heat may be applied to the mask. This heat will cause the mask surface 18 to adhere to the surface 21 of the back section 12. In addition, the layer of adhesive 20 on the side 19 of the mask will flow through the perforations 26 of the insert 22 and into adhering relation with the inner surface 27 of the front section 11 to adhere the latter to the mask 15 which is, in turn, adhesively secured to the back section 12 so that the front and back sections are adhesively connected. The insert 22 may be the same size as the mask 15 in which case the insert is held in place solely by means of the small portions 29 of the adhesive 20 which extend through the perforations 26 to secure the front 11 to the positioning mask. On the other hand, the insert 22 may be slightly smaller than the mask 15, as best shown in Fig. 2, in which case the adhesive layer 20 on the mask engages directly with the surface 27 outside the insert and cooperates with the portions 29 to retain the insert in position, as illustrated in Fig. 6.

While it is preferred to use a type of adhesive which softens under heat to facilitate machine assembly, it is contemplated that other forms of adhesive may be used. The important thing is, however, that the adhesive coating 20 on the mask surface 19 extends through the perforation 26 of the insert to adhesively connect the surface 27 of the front section 11 to the mask 15 to adhesively secure the sections 11 and 12 in assembled relation, but to non-adhesively retain insert 22 in proper position so that the edges 24 thereof will form the framing aperture.

The present invention thus provides a mount in which a clear, sharp projecting aperture is provided. Also the insert which forms a clear aperture is not secured directly to the mount parts but is retained in position solely by the small portions of adhesive which connect the mask to the front section. Thus the adhesive not only connects the front and back sections but also retains the metal insert in proper position in the mount.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

We claim:

1. In a lantern slide mount, the combination with a pair of overlying members formed with registering projecting apertures and adapted to receive an image-bearing transparency therebetween of a thin metallic sheet insert larger than said apertures and positioned between said transparency and one of said members, said insert having an opening in optical alignment with but slightly smaller than said apertures so that the edges of said opening will provide a clean-cut frame for the image portion of said transparency, said insert having the portions beyond said apertures formed with perforations extending therethrough, and adhesive means on one of said members extending through said perforations and contacting the other members to connect said members adhesively to retain the mount parts in assembled relation.

2. In a lantern slide mount, the combination with a pair of overlying members formed with registering apertures, a positioning mask carried by one of said members and formed with a seat larger than said apertures to receive and position an image-bearing transparency, of an opaque sheet insert positioned between said mask and the other of said members, said insert having an opening smaller than said apertures to afford a clean-cut frame for the image-bearing portion of said transparency, the areas of said insert beyond said apertures having perforations formed therein, and adhesive means carried by said mask and extending through said perforations and into engagement with said other member to secure said members in assembled relation and to position said insert.

3. In a lantern slide mount, the combination with a pair of apertured members adapted to be arranged in overlying relation wtih said apertures in register, of a positioning mask mounted between and adhesively secured to one of said members and formed with a cut-out recess larger than said apertures to receive an image-bearing transparency and to hold the latter in position relative to said apertures, a thin metallic insert larger than said apertures and positioned between said mask and said other member and formed with a projection opening smaller than said apertures to frame sharply the image-bearing portion of said transparency, the sections of said insert outside said apertures having a plurality of small perforations extending therethrough, and adhesive means carried by said mask and extending through said perforations and into engagement with said other members to connect said members adhesively to retain the mount in assembled relation and to position said insert so that the opening thereof will frame said image-bearing portion.

LOUIS S. RODGER.
COLQUITT H. CHAPMAN.

REFERENCES CITED

The following references are of record in the file of this patent:

UNITED STATES PATENTS

| Number | Name | Date |
| --- | --- | --- |
| 1,309,183 | Cochrane | July 8, 1919 |
| 1,467,108 | Hodgson | Sept. 4, 1923 |
| 1,538,249 | Lorenz | May 19, 1925 |
| 1,944,834 | Bennett, Jr. | Jan. 23, 1934 |
| 2,184,007 | Staehle | Dec. 19, 1939 |
| 2,186,827 | Engel | Jan. 9, 1940 |
| 2,268,529 | Stiles | Dec. 30, 1941 |
| 2,362,434 | Fitch et al. | Nov. 7, 1944 |